(12) United States Patent
Naccache et al.

(10) Patent No.: US 10,715,324 B2
(45) Date of Patent: Jul. 14, 2020

(54) DEVICE AND METHOD FOR SECURING COMMANDS EXCHANGED BETWEEN A TERMINAL AND AN INTEGRATED CIRCUIT

(71) Applicant: Ingenico Group, Paris (FR)

(72) Inventors: David Naccache, Paris (FR); Rémi Geraud, Antony (FR); Michel Leger, Saint-Germain-en-Laye (FR)

( * ) Notice: Subject to any disclaimer, the term of this patent is extended or adjusted under 35 U.S.C. 154(b) by 104 days.

(21) Appl. No.: 15/248,115

(22) Filed: Aug. 26, 2016

(65) Prior Publication Data

US 2017/0063548 A1 Mar. 2, 2017

(30) Foreign Application Priority Data

Aug. 27, 2015 (FR) ..................................... 15 57983

(51) Int. Cl.
*H04L 9/12* (2006.01)
*G06F 21/60* (2013.01)
*G06F 21/77* (2013.01)

(52) U.S. Cl.
CPC .............. *H04L 9/12* (2013.01); *G06F 21/602* (2013.01); *G06F 21/606* (2013.01); *G06F 21/77* (2013.01)

(58) Field of Classification Search
CPC ....... H04L 9/12; G06F 21/602; G06F 21/606; G06F 21/77
USPC .......................................................... 713/150
See application file for complete search history.

(56) References Cited

U.S. PATENT DOCUMENTS

| | | | | |
|---|---|---|---|---|
| 2004/0225888 | A1* | 11/2004 | Leaming | G06F 21/606 713/193 |
| 2005/0235162 | A1* | 10/2005 | Shih | G06F 21/602 713/193 |
| 2006/0107052 | A1* | 5/2006 | Guthery | G06F 21/335 713/172 |
| 2006/0136725 | A1* | 6/2006 | Walmsley | H04L 9/12 713/171 |

(Continued)

FOREIGN PATENT DOCUMENTS

WO    2012167352 A1    12/2012

OTHER PUBLICATIONS

GlobalPlafform Card Technology, Secure Channel Protocol 03, Card Specification v 2.2, Amendment D, Version 1.0, 2009, pp. 1-16.

(Continued)

*Primary Examiner* — Michael Pyzocha
*Assistant Examiner* — Zoha Piyadehghibi Tafaghodi
(74) *Attorney, Agent, or Firm* — Benoit & Côté Inc.

(57) ABSTRACT

The invention relates to a method for transmitting data implemented between a terminal and an integrated circuit, said terminal and said integrated circuit communicating by means of an interface for transmitting and receiving data. According to the invention, said method comprises at least one iteration of the following steps, implemented by the terminal,
generating (10) a command intended for said integrated circuit, said command comprising a command header;
encrypting (20) said command (CX), delivering an encrypted command (CC);
creating (20) a second command (CY), said command comprising a command header and data, said data being constituted at least partly by said encrypted commands (CC);

(Continued)

transmitting (40) said second command (CY) to said integrated circuit.

8 Claims, 6 Drawing Sheets

(56) References Cited

U.S. PATENT DOCUMENTS

| | | | | |
|---|---|---|---|---|
| 2009/0020603 A1* | 1/2009 | Foesser | ............... | G06Q 20/341 |
| | | | | 235/380 |
| 2009/0028078 A1* | 1/2009 | Balabine | ............. | H04L 63/0492 |
| | | | | 370/310 |
| 2009/0200372 A1* | 8/2009 | Naccache | ............ | G06Q 20/341 |
| | | | | 235/380 |
| 2014/0040633 A1* | 2/2014 | Leleu | ...................... | G06F 21/36 |
| | | | | 713/189 |
| 2015/0098564 A1 | 4/2015 | Chamley et al. | | |

OTHER PUBLICATIONS

Pietig, Functional Specification of the OpenPGP application on ISO Smart Card Operating Systems, Version 3.0, Jun. 2015.
Bsi et al., Advanced Security Mechanisms for Machine Readable Travel Documents and eIDAS Token, Part 3—Common Specifications, Version 2.20, Feb. 3, 2015.
Attali et al., Java on Smart Cards: Programming and Security, First International Workshop, Javacard 2000, Sep. 14, 2000.

* cited by examiner

DEVICE AND METHOD FOR SECURING COMMANDS EXCHANGED BETWEEN A TERMINAL AND AN INTEGRATED CIRCUIT

BACKGROUND OF THE INVENTION

1. Field of the Invention

The proposed invention relates to exchanges between a terminal and smart card. More particularly, the proposed technique relates to the securing of such exchanges. The proposed technique is aimed more particularly at securing the exchanges between a terminal and an integrated circuit. This integrated circuit can be placed in a smart card that can be read by the terminal. This reading can be done with or without contact, depending on the technology employed, both in the reading terminal and in the integrated circuit.

More specifically, the invention relates to the implementation of hardware and software extensions enabling the protection of the nature of the commands exchanged between a reader and an integrated circuit.

2. Description of the Related Art 2.1 Communications Between a Terminal and an Integrated Circuit as Embedded in a Smart Card At the applications level, the exchanges between a card reader (hereinafter called a "reader" or "terminal"), and a smart card that is inserted therein are carried out by means of application protocol data units (APDU).

2.1.1. The Basic Protocol

APDUs are commands transmitted by the terminal to the card. APDUs also govern the collection of the responses transmitted by the card to the terminal.

The format of these commands and responses is defined at the applications level by the ISO 7816-4 standard and its appendices A and B. The APDU commands are always activated by the terminal and the card must be constantly listening for APDUs coming from the terminal. In other words, according to the ISO 7816-4 standard, and using terminology of common usage among those skilled in the art, the terminal is in "master" mode while the card is in "slave" mode.

The terminal provides the card with energy supply and a clock signal whose frequency is typically 3.5 MHz. The card and the terminal exchange data through by a serial link, the flow rate of which ranges from 9,600 to 230,400 bauds. The terminal produces a request (APDU) which (in compliance with the transportation protocol T=0) comprises at least 5 bytes (CLA INS P1 P2 P3) and optional bytes (of which the length Lc is specified by the value of the byte P3).

The card reacts by delivering a response message which comprises information bytes (of which the length "Le" is specified by the byte P3) and a status word (SW1 SW2) with a width of two bytes SW1 SW2=9000 notifies the success of an operation. When the length of the response is not known in principle, a status word "61 Le" indicates the length of the response message. Once this parameter is known, the terminal obtains the information by means of the GET RESPONSE (CLA C0 00 00 Le) command, as shall be described in detail further below.

The read and write operations and the invocation of the cryptographic functions are associated with specific APDUs. The information stored in the card is stored in a system of files which includes a root directory (MF Master File), sub-directories (DF Dedicated File) and files (EF Elementary File). Each component is identified by a two-byte number; browsing through this system is done by means of particular APDUs (SELECT FILE, READ BINARY, WRITE BINARY) the details of which go beyond the framework of the present technique.

The security of communication between the card and the terminal is provided by simple or mutual authentication protocols (transported by APDUs) which, in the event of success, authorize access to the files.

The implementation of a card therefore uses a procedure call paradigm implemented (transported) by APDUs generally defined for a specific card operating system. The format of the embedded information is known in principle and classified by a system of 7816 type files.

2.1.2. Transportation of APDU Messages (TPDU)

There are several transport protocols. It is necessary to define rules for example to segment the APDUs into blocks compatible with the maximum size authorized by these protocols. Only rules defined for the protocol T=0 shall not be described in detail here.

The header of a TPDU (T=0) always comprises five bytes (CLA INS P1 P2 P3) instead of four in the case of the APDUs.

Case 1. TPDU=CLA INS P1 P2 P3=00

Case 2. exit order or outgoing order:

Short message (short), CLA INS P1 P2 P3=Le, outgoing order of 1 to 256 (Le=0) bytes. The status SW1=6C SW2=La can indicate the maximum value La supported by the card.

Long message (Extended), n adapted number (Le/256) of short requests CLA INS P1 P2 P3=0 is generated. In the last request, P3 is equal to the remainder modulo 256 of Le. An error-free response is terminated by the status 9000 (last segment of the response) or 61 xx (length P3 of the next request).

Case 3, incoming order:

Short message (short) CLA INS P1 P3 P3=Lc [Lc bytes]. Incoming order of 1 to 2555 bytes. A status 9000 indicates that the operation has been well executed.

Long message (Extended). A series of commands ENVELLOPE, CLA C2 P1 P2 P3 [P3 bytes 1, . . . , 255] is used to carry out the segmentation of the APDU to be transmitted. The status of the response is 9000 in the event of good execution.

Case 4, outgoing/incoming order:

Short message (short) CLA INS P1 P2 P3=Lc.[Lc bytes]. A status 61 Le indicates the size of the response. The outgoing command GET_RESPONSE CLA C0 P1 P2 P3=Le is used to read the response message, sized Le.

Long message (Extended). In this case, the commands ENVELLOPE and GET_RESPONSE are used.

Among the parameters defining the formats of the APDUs, the parameter CLA possesses a special role in the securing of exchanges (Secure Messaging mode). Thus, the parameter CLA is defined for the types of particular cards or by particular manufacturers. 00 is the ISO value, AO for the SIM cards, BC has been used by Bull CP8, FF is reserved for the PTS protocol. The quartet of high significance values is defined by the ISO 7816 standard for the values 0,8,9 and A. In this case, the quartet of low significance values comprises two bits which indicate the use of the Secure Messaging (SM: signature and encryption of APDUs) and the last two bits designate a logic channel number (ranging from 0 to 3). The notion of a logic channel implies the simultaneous use of several applications housed in the card.

2.1.3. Secure Messaging Mode

The purpose of the secured transmission of messages (SM) is to protect a part of the messages sent from and to a card in ensuring two elementary security functions: the authentication of data and the confidentiality of data.

The secured transmission of messages is done by applying one or more security mechanisms. Each security mechanism implements an algorithm, a key, an argument and often an initial piece of data.

The transmission and reception of data fields can be interlaced with the execution of security mechanisms. This specification does not exclude the determining, by sequential analysis, of the mechanisms and security tools which are used to process the remainder of the data fields.

Two or more security mechanisms can use the same algorithm in different embodiments (see ISO/IEC 7816). The present specifications of the fill rules do not exclude such a function.

This clause defines three types of data objects relating to SM:

plain data objects to transport data in plain-text form;

data objects associated with the security mechanisms, intended for transporting the result of the computations made by the security mechanisms.

auxiliary security data objects, to transport control references and descriptors of responses.

Without needing to go into the technical details of the implementing of the secured transmission mode of messages, it can be stressed that various mechanisms are implemented. They make it possible to obtain protection of certain data objects travelling between the terminal and the integrated circuit (these are for example data objects for authentication). Other data objects of lower sensitivity are not necessarily protected.

Indeed, the encryption and the signing (or authentication) of the data traditionally serve to secure the data exchanged between the card and the terminal. Thus, a terminal which encrypts and authenticates its APDU commands will protect only transferred data against interceptions and modifications. The commands for their part remain in plain-text form.

The encryption and authentication of data exchanged between the communicating apparatuses come under methods known to those skilled in the art, especially the deployment of public key infrastructures (PKI). A PKI is a set of physical and software components used to manage the life cycle of electronic certificates. These certificates make it possible to carry out cryptographic operations such as encryption and digital signature operations which offer the following guarantees during electronic transactions:

confidentiality: only the legitimate addressee (or the possessor) of a message can have an intelligible view;

authentication: during the transmission of a message or during connection to a system, the identity of the sender or the identity of the user who is connected is known with certainty;

integrity: there is the guarantee that a message sent will not be damaged, accidentally or intentionally;

non-rejection: the author of a message cannot deny what he has done.

It will be noted that there are techniques to ensure confidentiality, authentication and integrity all at once. These are for example "sign encryption" or "authenticated encryption" methods.

2.2. Drawbacks of the Prior Art.

As we have seen, the secure messaging mode does not ensure the confidentiality of the data or the confidentiality of the commands. Thus, the deployment of SM and a PKI in order to ensure encryption and authentication services is of no help against an attack for inferring information that can be used to infer security by using information provided by the APDU CLA INS P1 P2 P3 headers.

Such attacks can for example be:

The blocking of APDUs identified as being unfavorable to the user (for example blocking the erasure of a file of keys following the stoppage of payment of a subscription. Another example is the blocking of a debit order.)

Conversely, attacks by replay. These attacks consist in replaying an APDU which gives benefit to the user (for example credit from a wallet of monetary units).

Attacks known as "man in the middle" attacks which consist in taking position between the card and the terminal and deflecting communications between the card and the terminal at precise instants.

Reverse design or reverse engineering attacks consisting in spying on the exchanges between the terminal and the card in order to infer the operation of the underlying system and thus compromise intellectual property belonging to the designers of the system. Reverse design attacks can also enable the detection of protocol or transactional software flaws and enable software attacks on the underlying system.

The use of present-day external cryptographic devices such as present-day smart cards does not provide an answer to these threats because the ISO 7816 protocol enables the attacker to understand what a card does without, all the same, necessarily enabling the attacker to understand the data transmitted between the card and the terminal if the SM (Secure Messaging) mode is used.

As has been seen, if it is assumed that the attacker has total control over the link between the card and terminal and, in addition, has knowledge of the significance of the APDU CLA INS P1 P2 P3 headers exchanged between the card and the terminal, then it becomes impossible to ensure the total confidentiality of the application and/or of the system even if the confidentiality and integrity of the data exchanged remains guaranteed by an SM (Secure Messaging) procedure. These are major drawbacks that have enabled numerous attacks against systems implementing smart cards.

SUMMARY OF THE INVENTION

The present technique does not have these drawbacks of the prior art. More particularly, the present technique relates to a method for transmitting data. More particularly, the invention relates to a method for transmitting data implemented between a terminal and an integrated circuit, said terminal and said integrated circuit communicating by means of an interface for transmitting and receiving data, said method comprising at least one iteration of the following steps, implemented by the terminal:

generating a command intended for said integrated circuit, said command comprising a command header;

encrypting said command, delivering an encrypted command;

creating a second command, said command comprising a command header and data, said data being constituted at least partly by said encrypted commands;

transmitting said second command to said integrated circuit.

Thus, an attacker trying to determine the type or chaining of the commands exchanged between a terminal and an integrated circuit is not capable of obtaining useful information. Indeed, the observation of the exchanges between the terminal and the integrated circuit do not allow for obtaining relevant data. More particularly, the observation of the exchanges does not enable the deduction of the command that is transmitted since the real command, the one used to carry out a processing, is encrypted and encapsulated in another command.

According to one particular characteristic, such an integrated circuit takes the form of a SIM card and/or a bank card and/or a payment card and/or an electronic wallet.

According to one particular characteristic, such an integrated circuit takes the form of an identity card or again a card providing access to a protected resource such as for example an access control card.

According to one particular characteristic, such an integrated circuit takes the form of a card providing an access to television programs.

According to another characteristic, such an integrated circuit takes the form of a contactless card.

According to another characteristic, the transmission protocol complies with the 7816 standard.

According to another characteristic, the transmission protocol complies with at least one of the following standards ISO 14223, ISO 14443, ISO 15693, ISO 18000, ISO 18092, ISO 18185, ISO 21481, ASTM D7434, ASTM D7435, ASTM D7580 or ISO 28560-2.

According to one particular characteristic, said method for transmitting data furthermore comprises a step, prior to the encryption of said command, for the addition, to said command, of a first complementary piece of data, called a first piece of obfuscation data.

Thus, in addition to the masking of the command in itself, a masking of the size of this command is made. This means that the attacker cannot take the size of the commands as the basis for understanding the chaining of these commands. According to this characteristic, this masking is done by adding dummy data which will also be encrypted.

According to one particular characteristic, said method for transmitting data furthermore comprises a step, prior to the creation of said second command, for the addition, to said encrypted command, of a second piece of complementary data called a second piece of obfuscation data.

Thus, in addition to the masking of the command in itself, the invention carries out a masking of the size of this command. This means that the attacker cannot base his activities on the size of the commands to understand the sequencing of these commands.

According to one particular characteristic, said step of addition, to said command, of a first piece of obfuscation data comprises:
  a step for computing the size of said piece of obfuscation data by obtaining a difference between a value of a predetermined parameter and the size of said command;
  a step for obtaining a piece of data with a length identical to the size of said piece of obfuscation data, said data comprising a sequence of bits or random bytes.

Thus, in addition to the masking of the command in itself, the invention carries out a masking of the size of this command. More particularly, according to this characteristic, all the commands have a constant size. This means that, when observing exchanges between the card and the terminal, the attacker distinguishes only a succession of commands of constant size. The attacker is therefore incapable of deducing the probable content of the commands from an observation of these exchanges.

According to one particular characteristic, the method further comprises, subsequently to said step for transmitting, a step of time-out during a random time period.

According to one particular characteristic, said method furthermore comprises, prior to said step for transmitting said second command, a step for transmitting a third command.

According to one particular characteristic, said third command is generated randomly.

According to one particular characteristic, said step for transmitting comprises:
  a step for sub-dividing said second command into a plurality of command portions;
  a step for transmitting each portion of said plurality of command portions independently.

The invention also relates to a device for transmitting data addressed to an integrated circuit, said device and said integrated circuit communicating by means of an interface for transmitting and receiving data. Such a device comprises at least one module configured to perform:
  a generation of a command intended for said integrated circuit, said command comprising a command header;
  an encryption of said command delivering an encrypted command;
  a creation of a second command, said command comprising a command header and data, said data being constituted at least partly by said encrypted command;
  a transmission of said second command to said integrated circuit.

Thus the proposed technique provides a solution to at least some drawbacks of the prior art technique for protection against attacks based on spying and the modification of the commands exchanged between a terminal and a card.

More specifically, the proposed technique provides protection, independently of the encryption and/or signing and/or MACs used by the current system, to reduce to the utmost the attacker's understanding of the meaning (in the semantic sense) and precise nature (and not the content) of the exchanges between the terminal and the card.

Besides, the proposed technique makes it possible to comply with the ISO 7816 protocol or more generally to remain compliant with any protocol for exchanging commands and data between a card and a prior art terminal, for example the USB standard or again ISO 14223, ISO 14443, ISO 15693, ISO 18000: (Parts 1 to 7), ISO 18092, ISO 18185, ISO 21481, ASTM D7434, ASTM D7435, ASTM D7580 or ISO 28560-2.

Besides, the proposed techniques reinforce the security of the HCE mode by making the meaning of the commands of this mode.

According to a preferred implementation, the different steps of the methods according to the proposed technique are implemented by one or more computer software programs comprising software instructions to be executed by a data processor of a relay module according to the proposed technique and being designed to command the execution of the different steps of the method.

The proposed technique is therefore also aimed at providing a program that can be executed by a computer or by a data processor, and especially a secured processor, this program comprising instructions to command the execution of the steps of a method as mentioned here above when it is executed by a terminal and/or by an integrated circuit.

This program can use any programming language whatsoever and can be in the form of a source code, object code or a code that is intermediate between source code and object code, such as in a partially compiled form or in any other desirable form.

The proposed technique also aims to provide an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive, a flash memory or a storage memory of any other type.

Again, the information carrier can be a transmissible carrier such as an electrical or optical signal which can be conveyed via an electrical or optical cable, by radio or by other means. The program according to the invention can be especially uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component and to a hardware component as to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, gateway, router, etc) and is capable of accessing hardware resources of this physical entity (memories, recording media, communications buses, input/output electronic boards, user interfaces, etc).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smart card, a memory card, an electronic board for the execution of firmware, etc.

Each component of the system described here above naturally implements its own software modules.

The different embodiments mentioned here above can be combined with one another to implement the proposed technique.

BRIEF DESCRIPTION OF THE DRAWINGS

Other features and advantages of the proposed technique shall appear more clearly from the following description of a preferred embodiment, given by way of a simple illustratory and non-exhaustive example and from the appended drawings, of which:

the classic architecture of a smart card and a terminal is described in FIG. 1;

Figure 2:
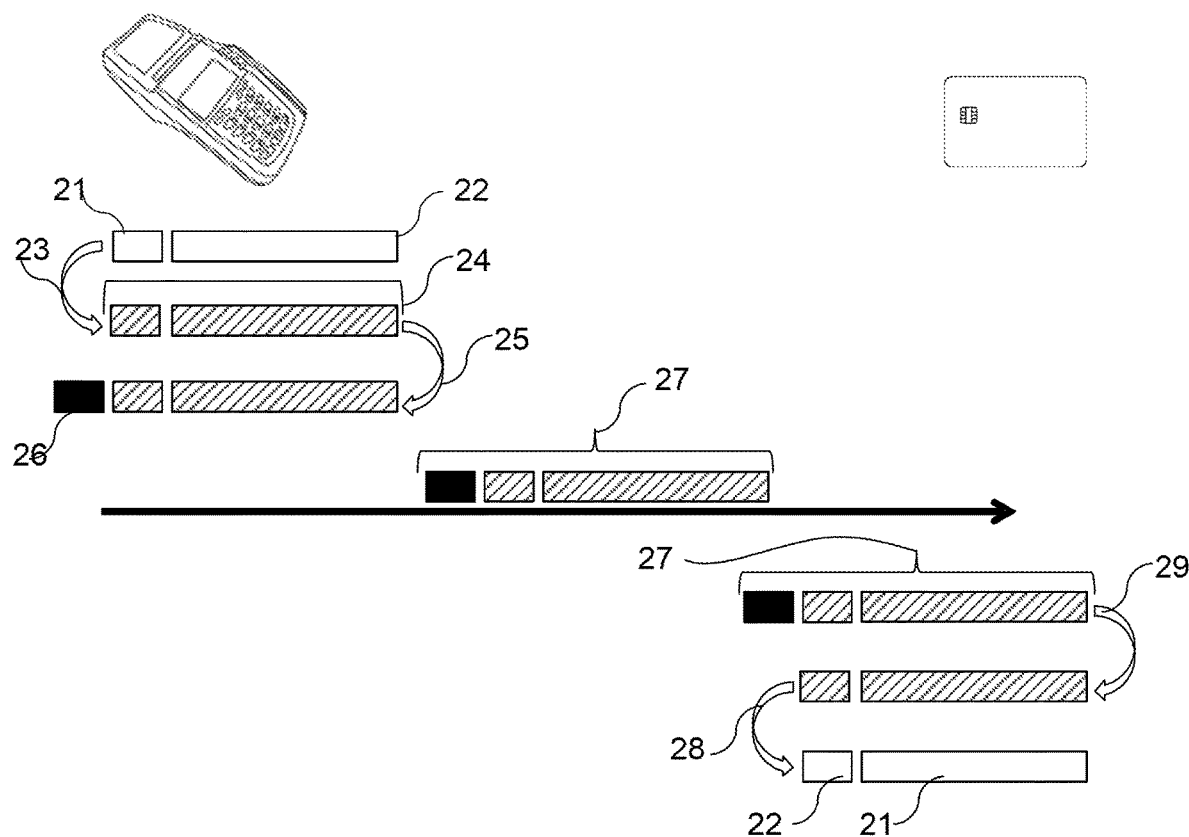
Figure 3:
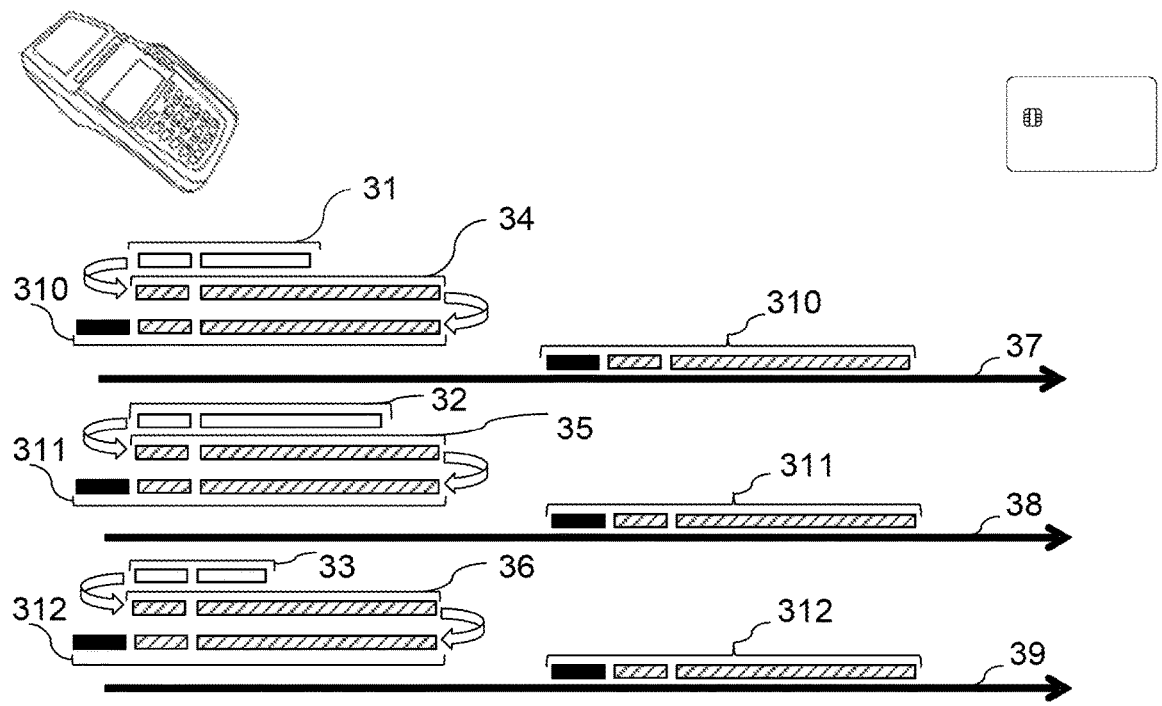
Figure 4:
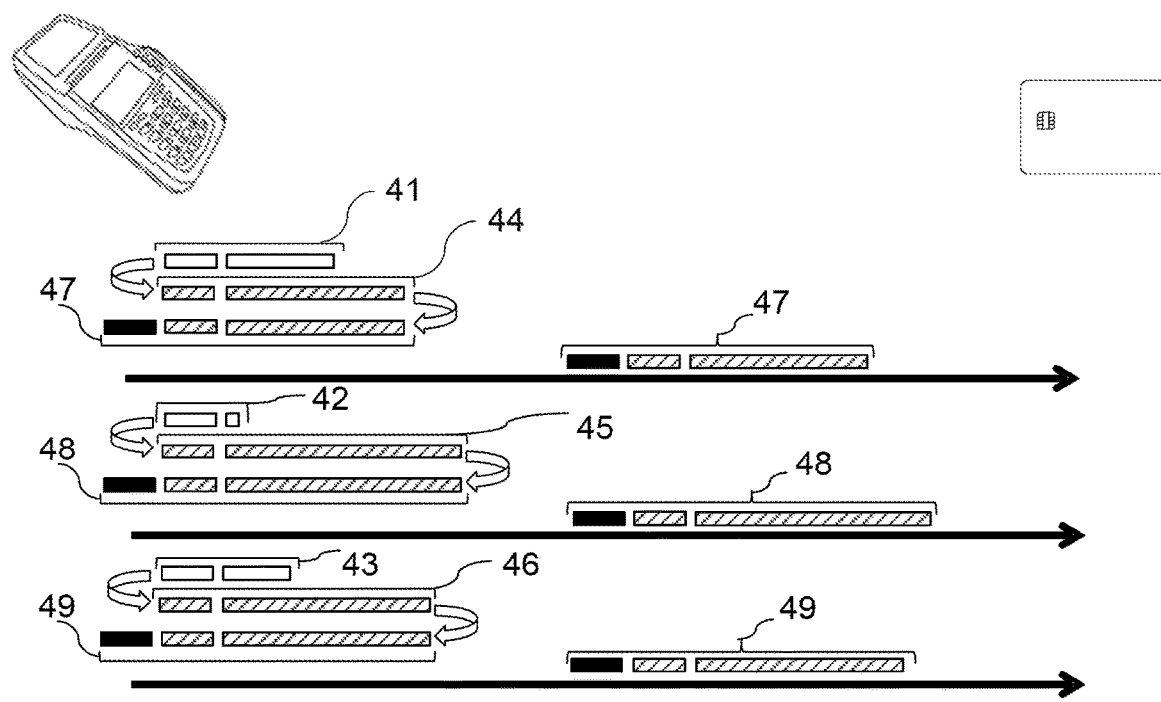
Figure 5:
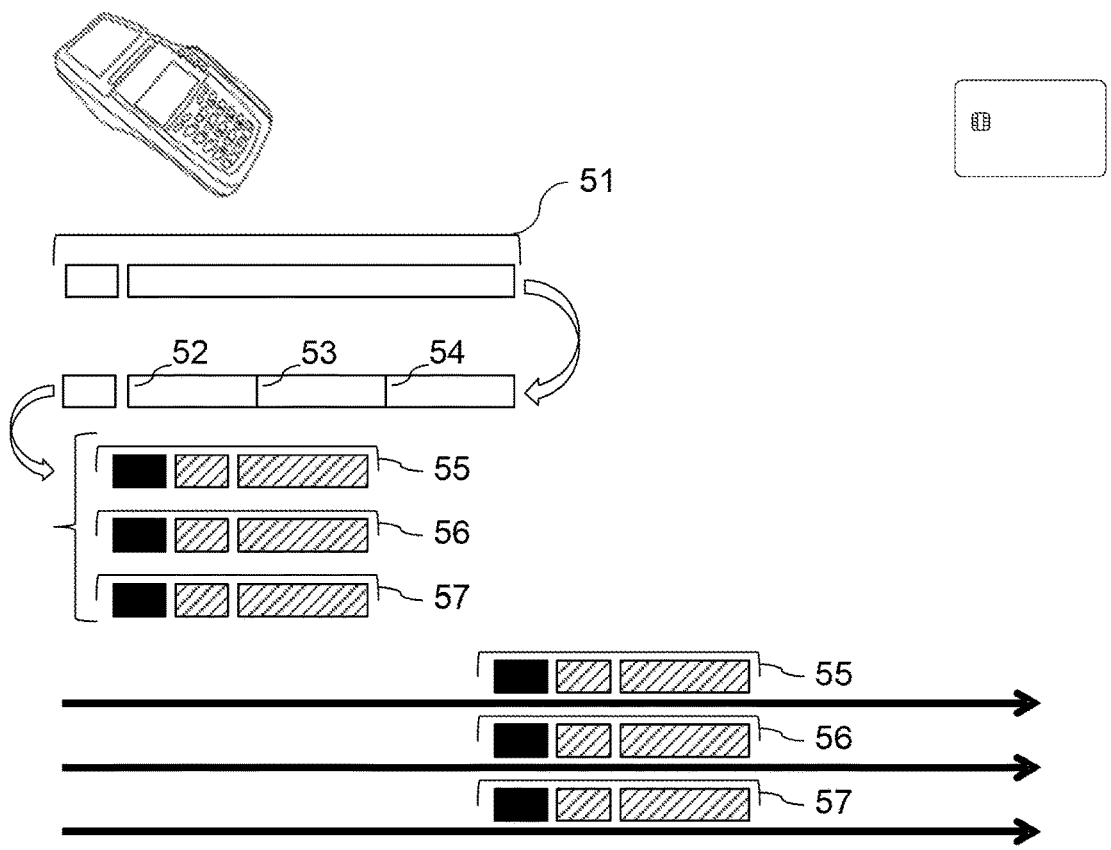
Figure 6:
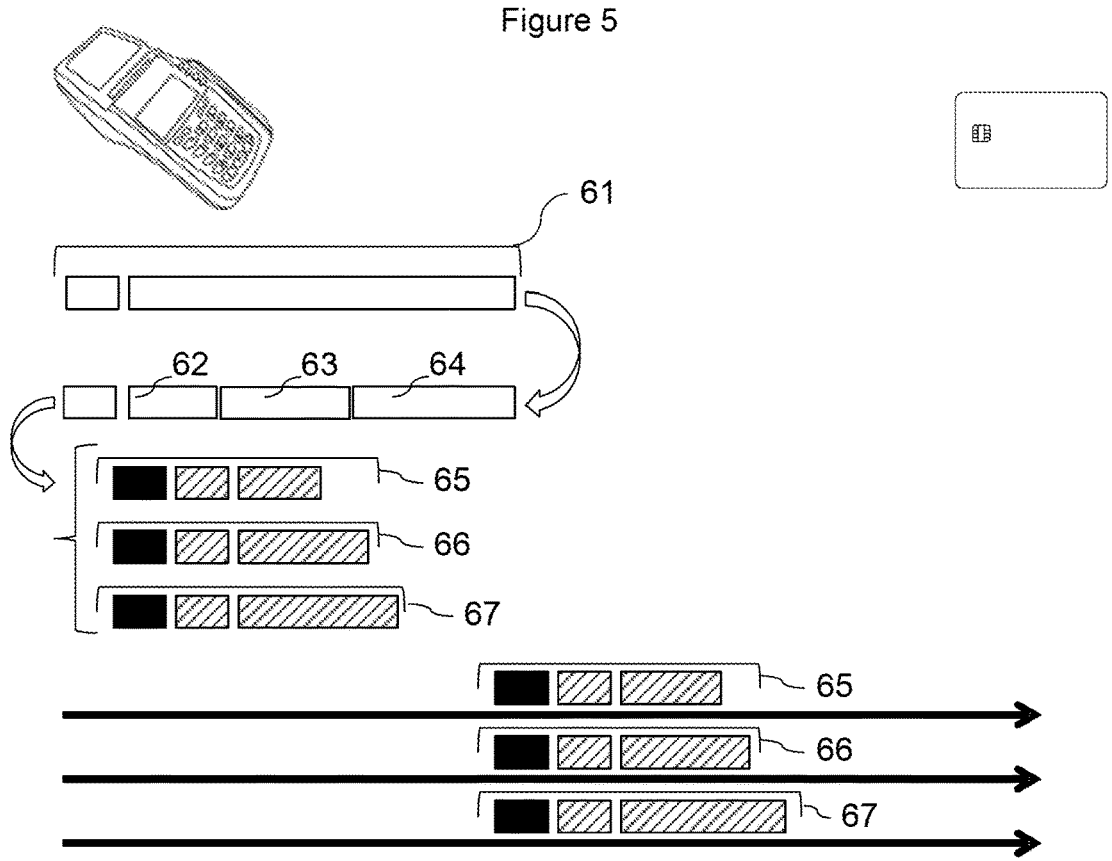
Figure 7:
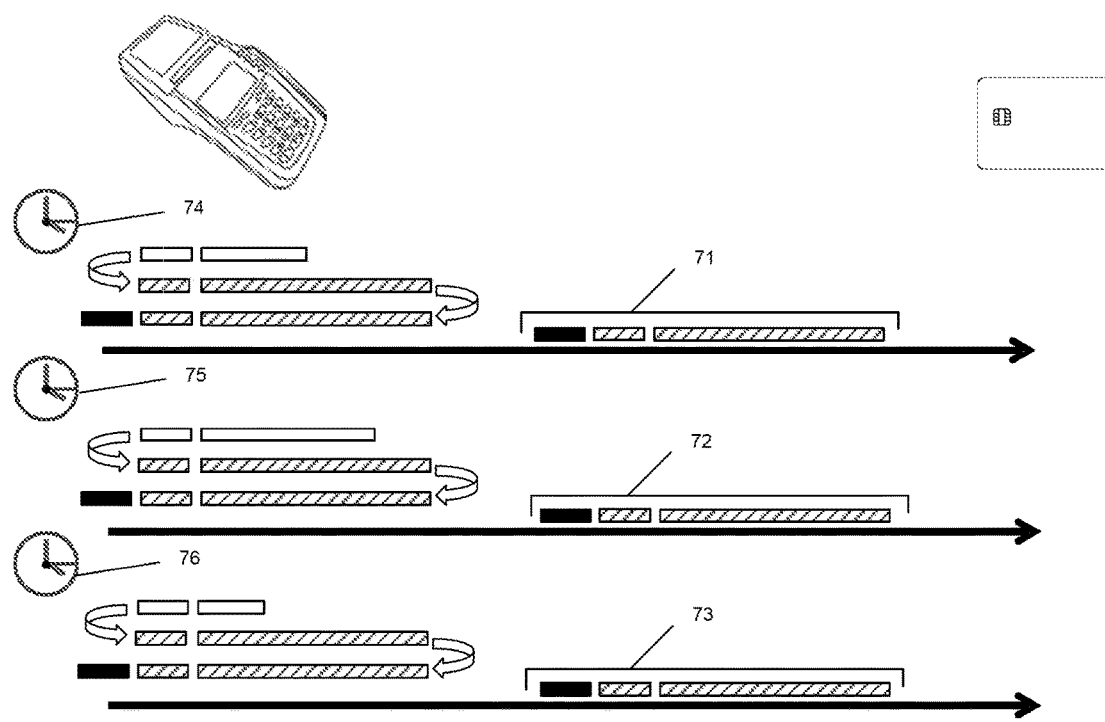
Figure 8:
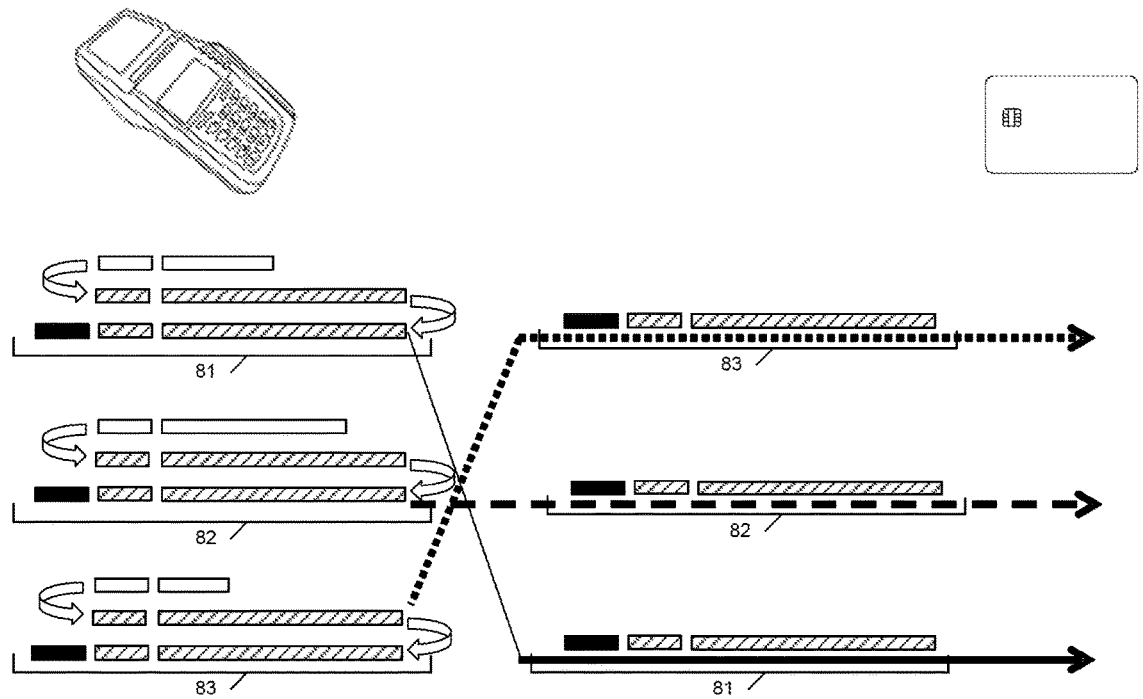
Figure 9:
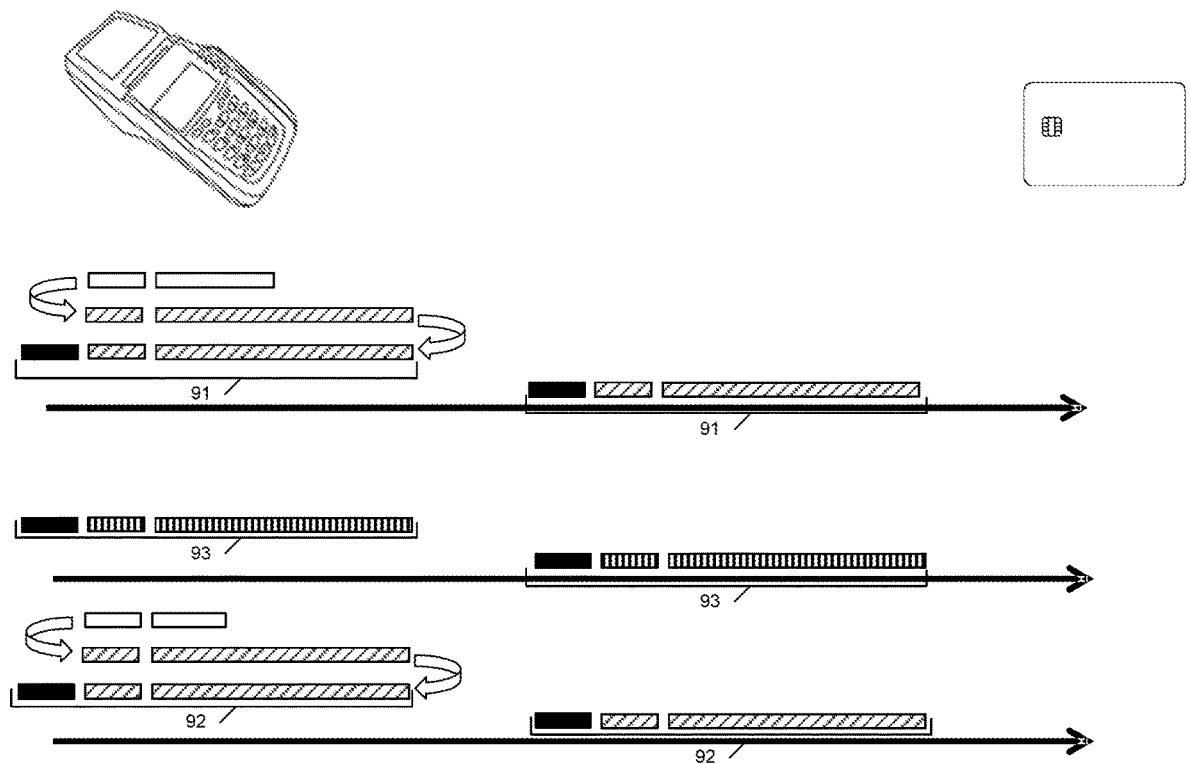
Figure 10:
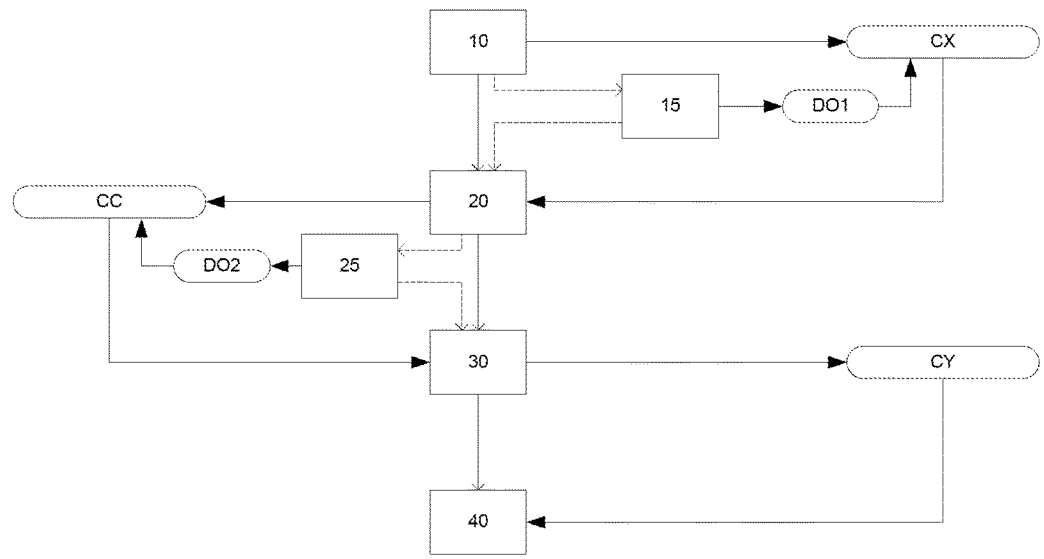
Figure 11:
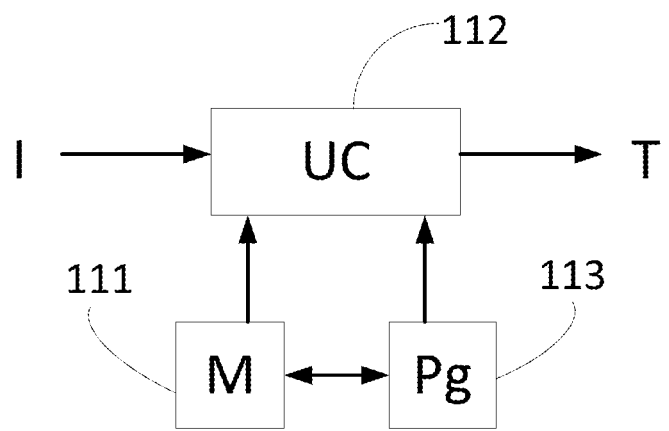
Figure 12:
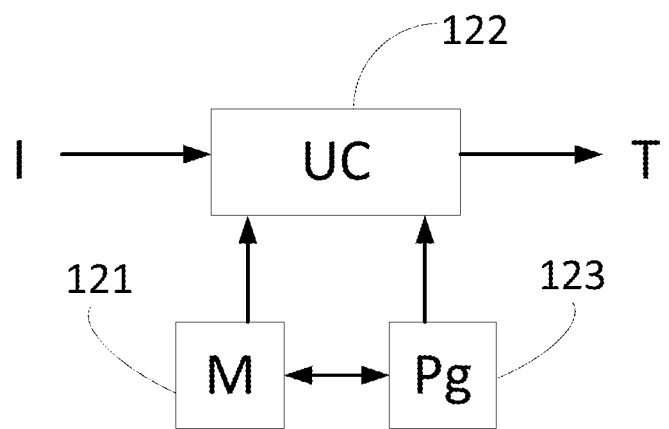

a first embodiment of the present technique, called a "direct mode" where the APDU commands and/or the applications data are encrypted and/or signed is described in FIG. 2;

a second embodiment of the present technique, called a "constant size mode" where all the associated commands and data have the same size enabling the information level to be further reduced is described in FIG. 3;

a third embodiment of the present technique called a "masked size mode" where a random number of unnecessary bytes is added to the data associated with each exchange command enabling the information level to be further reduced is described in FIG. 4;

a fourth embodiment of the present technique, called a "constant size sub-dividing mode" where the pieces of data associated with a command are sub-divided into data associated with sub-commands of constant size enabling the information level to be further reduced is described in FIG. 5;

a fifth embodiment of the present technique, called a "random sized sub-division mode" where the data associated with a command are sliced into data associated with sub-commands of random size enabling the information level to be further reduced is described in FIG. 6;

s sixth embodiment of the present technique, called a "random sized sub-division mode" where the data associated with a "random inter-command time-out" command technique in which the terminal inserts random waiting time intervals between the commands, enabling the information level to be further reduced is described in FIG. 7;

a seventh embodiment of the present technique called a "random command permutation" technique where the terminal, when this is possible in terms of applications, permutates the order of the commands enabling the information level to be further reduced is described in FIG. 8;

an eighth embodiment of the present technique called a "decoy command" technique, where the terminal generates and inserts a decoy command enabling the information level to be further reduced is described in FIG. 9;

FIG. 10 describes the general principle of the technique from the viewpoint of the terminal;

FIG. 11 briefly describes the hardware architecture of a terminal adapted to implementing the present technique;

FIG. 12 briefly describes the hardware architecture of an integrated circuit adapted to implementing the present technique.

DETAILED DESCRIPTION

General Principle

As explained above, one of the problems of present-day securing methods is related to the choices made to carry out the encryption of commands and responses exchanged. Indeed, at the time when the exchange standard was defined, it was thought that encrypting the content of the commands and responses was sufficient. However, it was seen that this encryption was insufficient and that, from the flow of commands/responses exchanged, a malicious (fraudulent) individual was also in a position to obtain precious information that could be used to breach the encryption of the commands. The inventors therefore had the idea of proposing a method in which a single command is exchanged between the terminal and the card. Similarly, a single response is given by the card. As described in detail here below, this method is compliant with current standards on exchanges between a card and a terminal and requires little adaptation whether from the terminal side or from the card side.

The proposed technique is implemented in a system comprising at least one terminal (13) and at least one smart-card microprocessor (11) communicating via a data input and output interface means (12). The terminal (13) and the card (11) are provided with memory and cryptographic computation means.

Figure 1:
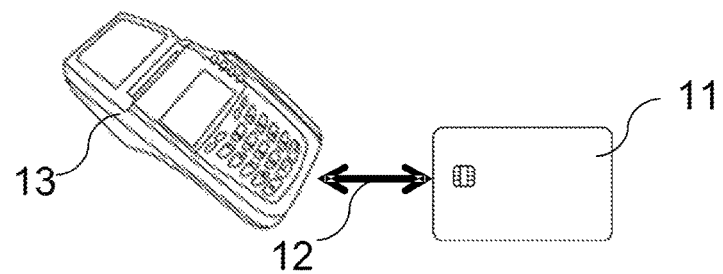

FIG. 1 illustrates a typical system implementing the invention. The terminal and smart card are adapted to implementing the APDU protection methods according to the present technique.

The present technique relates to a program product executed within the terminal (13) comprising program code instructions to implement the method according to the invention. The present technique relates to a program product executed within the card (11) comprising program code instructions to implement the method according to the invention. The present technique relates to a storage medium readable by the microprocessor of the terminal and non-transient, storing a program comprising a set of executable instructions to implement the method according to the invention. The present invention relates to a storage medium readable by the microprocessor of the card that is non-transient, storing a program comprising a set of instructions executable to implement a method according to the invention.

The proposed technique is based on the novel and inventive concept that the inventors have named as the "blind command" technique. This technique in general uses only one type of command from the terminal to the smart card. Similarly this technique uses only one type of response from the smart card.

To this end, in general, a command CX intended for a smart card is built by the terminal. This command is built in compliance with prevailing standards. This means that the command CX comprises a header and possibly data compliant with the standard (not all the commands include data). The pieces of data are protected (for example encrypted or signed) when a security policy is implemented, using existing methods (for example a secure messaging technique). This command CX constitutes a classic command which, according to the prior art, could be transmitted to the smart card. Unlike the prior art, however, this command CX is then protected: for example the command CX is encrypted (CC). Thus, the invention encrypts not only the data of the command but also its header.

According to the present technique, this command CX is then complemented by a second header. The second header which is a standard header enables the creation of a resulting command CY. The second header is independent of the command CX, except for a possible attribute relating to the size of the command. Depending on the embodiments, this size attribute is, if necessary, given the value of the size of the command CY. This makes it possible to comply with and carry out the methods for checking the integrity of the commands in the smart card.

The resulting command CY is then transmitted to the smart card. The smart card implements the classic process of verification of the received command CY. When this verification is done (for example the size of the command tallies with the size announced), according to the present technique, the command CX is extracted from the command CY. The command CX is then executed according to the prior art.

This technique is advantageous in more than one respect. First of all, it enables the signal travelling between the card and the terminal to be scrambled in a simple way. A fraudulent individual who has succeeded in obtaining the signal travelling between the card and the terminal perceives only a succession of commands and responses that always have the same format. He therefore cannot tell the difference between the commands that are exchanged. Indeed, from the fraudulent individual's viewpoint, the command is the same because the header of the command is a standard one.

More specifically, as explained with reference to FIG. 10, from the viewpoint of the terminal, the method comprises the following steps:

generating (10) a command (CX) intended for said integrated circuit, said command comprising a command header;

encrypting (20) said command (CX) delivering an encrypted command (CC);

creating (30) a second command (CY), said command comprising a command and data header, said data being constituted at least partly by said encrypted command (CC);

transmitting (40) said second command (CY) to said integrated circuit.

In a complementary manner, steps for adding obfuscation data can also be implemented. These pieces of obfuscation data, which can also be called padding data can be added before and/or after the encryption of the command. Thus, optionally, the method furthermore comprises, prior to the encryption of said command (CX), a step (15) for the addition, to said command (CX), of a first piece of complementary data called obfuscation data (DO1).

Besides, again optionally, the method furthermore comprises a step, prior to the creation of said second command (CY), for the addition (25) to said encrypted command (CC) of a second complementary piece of data, called a second piece of obfuscation data (DO2). As explained here below, the obfuscation data can be of random size or of constant size. The obfuscation data can have the final purpose of masking the real size of the command.

Coupled with other techniques, such as those described below, it becomes even more complicated to determine the command. It is quite clear that the embodiments described below can be freely combined with one another without any departure from the framework of the present invention being entailed by these combinations. Thus, the specific benefits of each embodiment can be combined to enable an ever more efficient masking of the exchanges that take place between the terminal and the integrated circuit.

The technique described also relates to a method of processing implemented between a terminal and an integrated circuit, said terminal and said integrated circuit communicating by means of an interface for the sending and transmission of data, said method comprising at least one iteration of the following steps implemented by the integrated circuit:

receiving said second command coming from the terminal;

eliminating the header of the second command and obtaining at least one command portion pertaining to said encrypted command (CC);

decrypting said command (CC), delivering the first command (CX);

processing the first command (CX).

As a complement, this processing of the first command by the integrated circuit can require the furnishing of a response by this integrated circuit. This response is then transmitted by the integrated circuit to the terminal. This transmission is also accompanied by obfuscation measures which can include the sub-division of the response into several responses, the addition of obfuscation data to the response, etc.

The different steps of the methods presented above are implemented by means of components, whether hardware or software components, which are integrated either into the terminal or into the integrated circuit. Thus, for example, the cryptographic operations, such as encryption operations, could be implemented by a cryptographic hardware component while the steps for obtaining obfuscation data, padding data etc. can be implemented by software means.

Embodiments

According to a first embodiment, called a "direct mode", illustrated in FIG. 2, a Blind Command (27) is built by considering the header of an ISO CLA INS P1 P2 P3 command (21) and the associated data (22) as a passive piece of data D (21+22).

"D" is cryptographically protected (23) by the terminal (for example D is encrypted, signed and/or "MACed") in order to give a resulting protected command P (24).

A second universal and anonymous header CLA INS P1 P2 P3 (26) is then added (25) to P in order to form a Blind Command "A" (27). The CLA INS P1 P2 P3 codes used to form the second header (26) are independent of D (except for P3 which encodes the size).

"A" is then transmitted to the card by means of a universal ISO command called a Blind Transport Command (27).

The card receiving "A" removes (29) the second ISO header (26) in order to retrieve P (24).

The card decrypts (28) P and retrieves D (21+22).

If necessary, the card checks the integrity of D.

Then, the card interprets (executes) the command D.

If the interpretation of the command D requires a transmission of bytes U of the card, these bytes are encrypted so that their content is not revealed and so as to prevent the nature of the command D from being understood. In order to protect the system against an attack in which D is inferred from the size of the response U, the card can either re-pad the bytes U of the response U until a fixed size is reached or on the contrary concatenate a random quantity of unnecessary bytes aimed at masking the true size of U.

Thus, an attacker observing exchanges between the terminal and the card can infer only very little information from this observation. Indeed, the attacker, who sees only A-type commands, cannot know which commands D are concealed within A-type commands transmitted by the terminal to the card and therefore does not know the functions activated within the card by the terminal.

According to a second embodiment, called a "constant size mode" illustrated in FIG. 3, the size of the data transmitted during the command D is concealed.

To this end, all the commands D[i] (31, 32, 33) are automatically complemented by the addition of unnecessary bytes in order to make all the commands D[i] (34, 35, 36) of constant size. Thus, an attacker observing the exchanges (37, 38, 39) between the terminal and the card cannot infer the nature of the commands D[i] from the size of the data that the commands A[i] (310, 311, 312) convey.

As an alternative, and for the sake of saving computation time, it is possible to avoid unnecessarily extending the messages D[i] but to take the encrypted data units P[i] and add to them as many random bytes as needed in order to make all the commands A[i] attain a same constant size.

According to a third embodiment called a "masked size mode" illustrated in FIG. 4, the size of the data transmitted during the commands D[i] is concealed by a means different from the second embodiment.

To this end, at least certain of the commands D[i] (41, 42, 43) are complemented by the addition of a random number of unnecessary random bytes in order to make all the data units P[i] (44, 45, 46) have a size decorrelated from the size of the payload data contained in the D[i] command. This induces a situation where we have corresponding data units P[i] (44, 45, 46) of random size. Thus, an attacker observing the exchanges (47, 48, 49) between the terminal and the card cannot infer the nature of the commands D[i] from the size of the data exchanged between the card and the terminal.

As an alternative, and for the sake of saving computation time, it is possible to avoid unnecessarily extending the D[i] messages but to take the encrypted data units P[i] and to add to them as many random bytes as needed in order to make all the commands A[i] attain various random sizes.

According to a fourth embodiment, called a "constant size sub-division mode" illustrated in FIG. 5, the size of the pieces of data transmitted during the command D is concealed by a means different from those of the second and third embodiments.

To this end, the command D (51) is sub-divided into blocks of constant size (52, 53, 54). In doing so, the command D is converted into a plurality of commands P[ij] (55, 56, 57) of a size decorrelated from the size of the payload data contained in the D[i] commands. Thus, an attacker observing the exchanges between the terminal and the card cannot infer the nature of the commands D[i] from the size of the data that the D[i] data convey because the end of D[i] cannot be distinguished from the start of the next command D[i+1].

According to a fifth embodiment, called a "random sized sub-division mode", illustrated in FIG. 6, the size of the data transmitted during the command D is concealed by a means other than those of the second or third or fourth embodiments.

To this end, the command D (61) is sub-divided into blocks of random size (62, 63, 64). In doing so the command D is converted into a plurality of commands P[I,j] (65, 66, 67) of a size decorrelated from the size of the payload data contained in D. Thus, an attacker observing the exchanges between the terminal and the card cannot deduce the nature of the command D from the size of the data transmitted.

According to a sixth embodiment, called a "random inter-command time lags" mode, illustrated in FIG. 7, the nature of the commands D[i] is concealed in not allowing the attacker to measure the time that passes between these commands.

To this end, after and/or before transmission of each blind command A[i] (71, 72, 73), the terminal observes a random waiting time (74, 75, 76) also called a time-out for a random period of time. Similarly, the card can also wait for a random period of time before transmitting the encrypted data U[i] awaited in response to the command A[i]. Thus, an attacker observing the exchanges between the terminal and the card cannot infer the nature of the commands D[i] transmitted to the card by the terminal by measuring the time that has elapsed between the commands D[i] or by measuring the time that has elapsed between the reception of the commands A[i] by the card and the transmission of the response U[i] by the card.

According to a seventh embodiment, called a "random command permutation" embodiment illustrated in FIG. 8, the nature of the commands D[i] is concealed in not allowing the attacker to infer the nature of the commands by observing the order in which they are sent to the card.

To this end, when the order of commands D[i] has no incidence on the working of the card, and therefore on the underlying application, the terminal permutates the commands D[i] randomly before transmitting the corresponding commands A[i] (81, 82, 83) to the card. Thus, an attacker observing the exchanges between the terminal and the card cannot infer the nature of the commands D[i] according to the order of the commands A[i] corresponding to the commands D[i].

According to an eighth embodiment known as "decoy commands" embodiment illustrated in FIG. 9, the nature of the commands D[i] is concealed by not allowing the attacker to infer the nature of the commands in counting their number.

To this end, when a sequence of commands D[i] must be transmitted to the card, the terminal inserts decoys (93) into the stream of the commands A[i] corresponding to the commands D[i] (91, 92). A decoy (93) is a command A[i] that is not interpreted by the card except by sending a random response simulating a figure U[i] and obeying a distribution of probabilities similar to or identical to the one induced by the application implemented between the terminal and the card. Thus, an attacker observing exchanges between the terminal and the card cannot infer the nature of the commands D[i] and cannot do so even in counting the number of A[i] commands sent by the card to the terminal.

Implementation Devices

Referring to FIG. 11, we describe a device for transmitting data comprising means enabling the execution of the method described above.

For example, the transmission device comprises a memory 111 constituted by a buffer memory, a processing unit 112 equipped for example with a microprocessor and driven by a computer program 113 implementing the steps needed for the creation, encryption and transmission of obfuscation commands known as blind commands.

At initialization, the computer program code instructions 113 are for example loaded into a memory and then executed by the processor of the processing unit 112. The processing unit 112 inputs for example a basic command to be transmitted to an integrated circuit. The microprocessor of the processing unit 112 implements the steps of the method according to the instructions of the computer program 113 to enable the creation of the blind command.

To this end, the processing device comprising, in addition to the buffer memory 111, means for obtaining encryption hardware, encryption means and means for obtaining obfuscation data such as padding data.

These means can be driven by the processor of the processing unit 112 as a function of the computer program 113.

Referring to FIG. 12, a description is provided of an integrated circuit, for example inserted into a card, in order to form a smart card, comprising means for executing the method described here above.

For example, the verification device comprises a memory 121 constituted by a buffer memory, a processing unit 122 equipped for example with a microprocessor and driven by a computer program 123 implementing the steps needed to implement verification functions.

At initialization, the computer program code instructions 123 are for example loaded into a memory and then executed by the processor of the processing unit 122. The processing unit 122 inputs for example a basic command to be transmitted to an integrated circuit. The microprocessor of the processing unit 122 implements the steps of the method according to the instructions of the computer program 123 the decryption of the command, the processing of the decrypted command and the transmission, as the case may be, of a response to this command.

To this end, the processing device comprising, in addition to the buffer memory 121, means for obtaining encryption/decryption keys; these means can take the form of a processor or a set of secured resources that can be used to secure the entry of the authorization. The device also comprises cryptographic processing means. These processing means comprise for example a dedicated encryption processor.

These means can be driven by the processor of the processing unit 122 as a function of the computer program 123.

The Host Card Emulation (HCE) Mode

Another particularly worthwhile application of the present technique is the HCE (Host Card Emulation) mode. The NFC mobile payment currently used is based on a Secured Element (SE): the SIM card predominantly. This SIM card, which is the property of the mobile operator, is a source of constraints for providers of mobile payment solutions. To remedy this problem, the parties involved in electronic money applications have created the emulation of hosted cards better known by the abbreviation HCE (Host Card Emulation).

Classic Architecture

To properly understand the functioning of the HCE, it is important to recall that of the present model in which the SE is embedded in the mobile communications terminal. The classic NFC mobile payment is a payment where the smart phone acts as a bank card. The NFC antenna enables the communications terminal to interface with the electronic payment terminal (EPT). The NFC controller acts on the SE (often the SIM card in which case the term used is SIM-centric card) which contains sensitive bank data (card number also called the PAN, cryptographic keys, etc.). At no time does the operating system have knowledge of this data. Herein lies the robustness of the NFC SE. The installation of the payment application within the SIM card brings into play new actors such as trusted third parties (Trusted Service Managers or TSM), involves mobile operators (Mobile Network Operators: MNO) and more generally complicates the NFC ecosystem both for the institutions/providers and for the bearers.

Operation of the HCE

Specified initially by the startup SimplyTapp in 2012, the Host Card Emulation made its appearance in the market with the CyanogenMod™ operating system. However, it is the adoption of SimplyTapp's system within the Android™ 4.4 KitKat™ operating system that has made it popular.

Conceptually, HCE technology enables the desynchronization of NFC with the SE hosted by the communications terminal. The operating system OS thus directly drives the NFC. Thus, in its most primitive form, the mobile application installed in the OS can embed the bank data. However, the technology enables far more interesting applications such as data storage in the cloud, better known as "SE-in-the-cloud".

Besides, in order to limit the risk of retrieval of sensitive data by malware executed in the memory of the communications terminal, engineers have had the idea of generating disposable card numbers. This security is called tokenization. Tokenization has been the subject of specification by the EMVCo organization in order to ensure interoperability.

The technique described above can also be applied in this mode of operation. Indeed, the integrated circuit is then no longer a smart payment card but is, for example, a SIM card of the communications terminal. As an alternative, when data units are exchanged through a communications network, for example APDUs through an IP network, a virtual integrated circuit is simulated within this network.

The invention claimed is:

1. Method for transmitting data between a terminal and an integrated circuit, said terminal and said integrated circuit communicating by means of an interface for transmitting and receiving data, said method comprising at least one iteration of the following steps, implemented by the terminal, generating a first command intended for said integrated circuit, said first command comprising data and a first command header;

adding to said first command a first complementary piece of data, called a first piece of obfuscation data, encrypting said data of said first command and said first command header, delivering a first encrypted command comprising the data of said first command, the first piece of obfuscation data and the first command header;

generating a second command, said second command comprising a second command header and data being constituted by said first encrypted command, said second command header being a universal and anonymous header; and transmitting said second command to said integrated circuit via a stream of commands into which at least one decoy command is also inserted.

2. Method for transmitting data according to claim 1, wherein it furthermore comprises a step, prior to the creation of said second command, for the addition, to said first encrypted command, of a second piece of complementary data called a second piece of obfuscation data.

3. Method for transmitting data according to claim 1, wherein said step of addition, to said first command, of a first piece of obfuscation data comprises:

a step for computing the size of said piece of obfuscation data by obtaining a difference between a value of a predetermined parameter and the size of said first command;

a step for obtaining a piece of data with a length identical to the size of said piece of obfuscation data, said data comprising a sequence of bits or random bytes.

4. Method for transmitting data according to claim 1, wherein it further comprises, subsequently to said step for transmitting, a step of time-out during a random time period.

5. Method for transmitting data according to claim 1, wherein it further comprises, prior to said step for transmitting said second command, a step for transmitting a third command.

6. Method according to claim 5, wherein said third command is generated randomly.

7. Method according to claim 1, wherein said step for transmitting comprises:

a step for sub-dividing said second command into a plurality of command portions;

a step for transmitting each portion of said plurality of command portions independently.

8. Device for transmitting data addressed to an integrated circuit, said device and said integrated circuit communicating by means of an interface for transmitting and receiving data, said device comprising at least one module configured to perform:

a generation of a first command intended for said integrated circuit, said first command comprising data and a first command header;

an addition to said first command of a first complementary piece of data, called a first piece of obfuscation data;

an encryption of said data of said first command, the first piece of obfuscation data, and said first command header delivering a first encrypted command comprising the data of said first command and the encrypted first command header;

a creation of a second command, said second command comprising a second command header and data being constituted by said first encrypted command, said second command header being a universal and anonymous header; and a transmission of said second command to said integrated circuit via a stream of commands into which at least one decoy command is also inserted.

* * * * *